US007067771B2

(12) United States Patent
Omura

(10) Patent No.: US 7,067,771 B2

(45) Date of Patent: Jun. 27, 2006

(54) STEAM GENERATOR

(75) Inventor: Shingo Omura, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/151,275

(22) Filed: Jun. 14, 2005

(65) Prior Publication Data

US 2005/0274330 A1 Dec. 15, 2005

(30) Foreign Application Priority Data

Jun. 14, 2004 (JP) ............................ 2004-176168

(51) Int. Cl.
*A21B 1/00* (2006.01)

(52) U.S. Cl. ....................... 219/399; 392/386; 392/400

(58) Field of Classification Search ..................... None
See application file for complete search history.

(56) References Cited

U.S. PATENT DOCUMENTS 3,493,722 A 2/1970 Popeil
4,190,052 A 2/1980 McCarthy

FOREIGN PATENT DOCUMENTS

| | | |
|---|---|---|
| DE | 42 41 616 A1 | 6/1994 |
| GB | 1 225 181 A | 3/1971 |
| JP | 2001-190632 A | 7/2001 |

OTHER PUBLICATIONS

European Search Report for the Application No. EP 05 01 2360, dated Oct. 4, 2005.

*Primary Examiner*—Thor S. Campbell
(74) *Attorney, Agent, or Firm*—Rader, Fishman & Grauer PPLC

(57) ABSTRACT

A steam generator with improved safety and ease of use is provided. In this steam generator, water provided from a water tank is heated by a heater to generate a steam in a chamber, and then the steam is sprayed out through a steam channel. An overflow port is formed in the water tank such that an adequate water level is safely maintained even when an excessive amount of water is supplied into the water tank from a water inlet. The steam generator has a shutter disposed in a drain channel for water drained from the water tank through the overflow port and an interlocking mechanism for opening and closing the shutter in response to an opening and closing motion of a cover for the water inlet. This achieves good usability of the steam generator.

8 Claims, 6 Drawing Sheets

STEAM GENERATOR

BACKGROUND OF THE INVENTION

1. Field of the Invention

The present invention relates to a steam generator, which is preferably used as a skin care apparatus such as facial steamer.

2. Disclosure of the Prior Art

In the past, a steam generator has been widely used as a humidifier for controlling indoor moisture levels, skin care apparatus such as facial steamer for moisturizing skin, facilitating cell metabolism and opening up pores to remove dead skin cells and clean skin surface, and a steam inhaler for providing warm moist air to nose and throat and relieving or minimizing symptoms of hay fever and a cold.

In this kind of apparatus, since water is heated to boiling to obtain steam, safety is the most important subject. For example, Japanese Patent Early publication [kokai] No. 2001-190632 discloses a steam beauty machine with the purpose of improving the safety. This beauty machine 1M is, as shown in FIG. 9, formed with a water tank 3M, heater 4M for heating water of the water tank to generate steam, and a nozzle 80M for providing a steady flow of steam. Since a condensate guide member 82M is disposed at a rear end portion of the nozzle, condensation generated at the periphery of the nozzle is efficiently returned to the water tank. Therefore, it is possible to prevent that hot drops of water accidentally jetted out from the nozzle.

Besides the improvement of safety, it is desired to improve usability of the steam generator, ease of maintenance such as a removal of water scale, and resistance to water leakage in the case that the steam generator is accidentally tilted or toppled over.

SUMMARY OF THE INVENTION

Therefore, a primary object of the present invention is to provide a steam generator with improved usability and safety.

That is, the steam generator of the present invention comprises:

a housing having a steam outlet and a liquid inlet;

a cover for said liquid inlet;

a liquid tank accommodated in the housing and having an overflow port;

a liquid supply channel extending between the liquid inlet and the liquid tank;

a heater for heating a liquid provided from the liquid tank to generate a steam in a chamber formed in the housing;

a steam channel extending from the chamber to the steam outlet;

a drain channel for the liquid drained from the liquid tank through the overflow port;

a shutter disposed in the drain channel; and an interlocking means for opening and closing the shutter in response to an opening and closing motion of the cover.

According to the present invention, when the cover is opened, the overflow port is automatically opened by the interlocking means. Therefore, even when an excessive amount of the liquid is supplied into the liquid tank, it is possible to stably maintain an adequate liquid level in the liquid tank. In addition, since the overflow port is closed by the interlocking means in response to the closing motion of the cover, it is possible to smoothly finish the operation of supplying the liquid into the liquid tank, and improve the usability of the steam generator.

In a preferred embodiment of the present invention, the cover is a hinge cover, and the interlocking means comprises a rib formed on the hinge cover and a seesaw member having its one end coupled to the rib and its other end coupled to the shutter. In this case, it is preferred that the rib is coupled to the one end of the seesaw member through a first movable member, and has a flat end portion, which contacts a top of the first movable member such that the hinge cover takes a standing posture in its full open state. In addition, it is preferred that the shutter is a flow plug made of an elastic material and provided at one end of a second movable member, and an opposite end of the second movable member is coupled to the other end of the seesaw member. By use of the hinge cover, there is no worry about missing the cover. In addition, since the standing posture of the hinge cover is stably maintained, the liquid can be further easily supplied into the liquid tank without being interfered by the hinge cover.

In addition, it is preferred that the rib is coupled to the one end of the seesaw member through a first movable member, and the shutter is coupled to the other end of the seesaw member through a second movable member, and the seesaw member is configured such that a moving distance of the second movable member is greater than the moving distance of the first movable member. In particular, it is preferred that the seesaw member is configured in a wave-like shape at its one end coupled to the first movable member. In this case, it is possible to facilitate downsizing of the steam generator, while maintaining reliability of the shutter motion.

In another preferred embodiment of the present invention, the steam generator comprises a seal member made of an elastic material and attached to the cover, a button member exposed to a surface of the housing to be operable by a user, a spring member for applying a spring bias to the button member, and a hook for engaging a groove formed in the cover. In this case, the seal member is elastically deformed to seal the liquid inlet in a waterproof manner by an engagement between the hook and the groove. On the other hand, when the engagement is released by an operation of the button member against the spring bias, the cover is removed from the liquid inlet in a pop-up manner by a resilient force of the seal member. In addition, it is preferred that the cover has an inclined surface formed adjacent to the groove, so that the hook contacts the inclined surface of the cover after the engagement between the hook and the groove is released, and pushes the cover in a direction of increasing an opening amount of the cover.

Another features of the present invention and advantages brought thereby will be more clearly understood from the following detail description referring to the attached drawings.

DETAIL DESCRIPTION OF THE INVENTION

As a preferred embodiment of a steam generator of the present invention, a steam beauty machine is explained below in details, referring to the attached drawings.

Figure 1A:
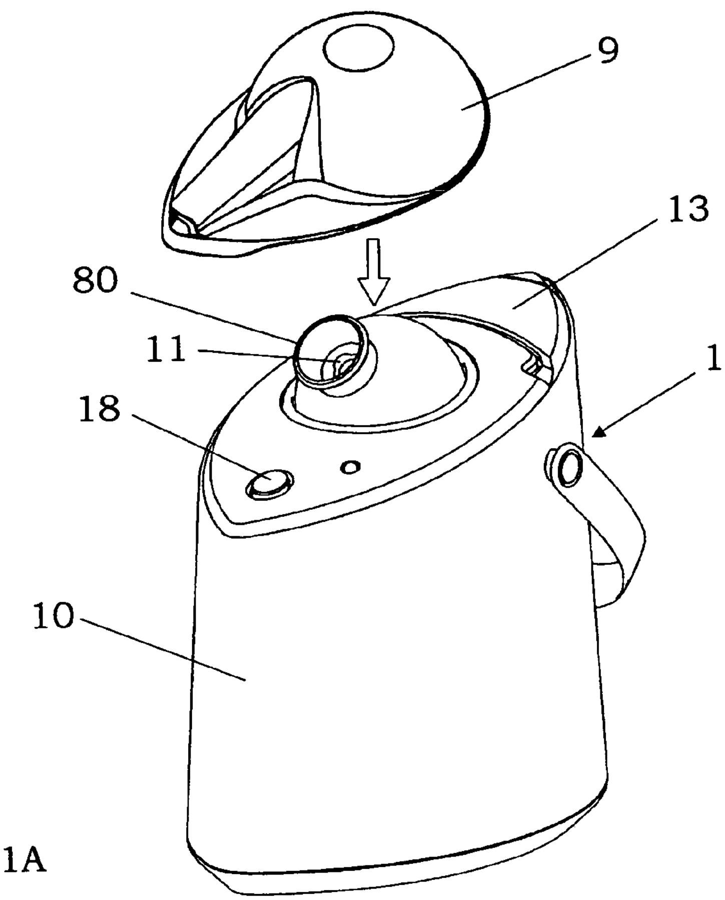
FIGS. 1A and 1B are perspective and cross-sectional views of a steam beauty machine as a preferred embodiment of a steam generator of the present invention.
Figure 1B:
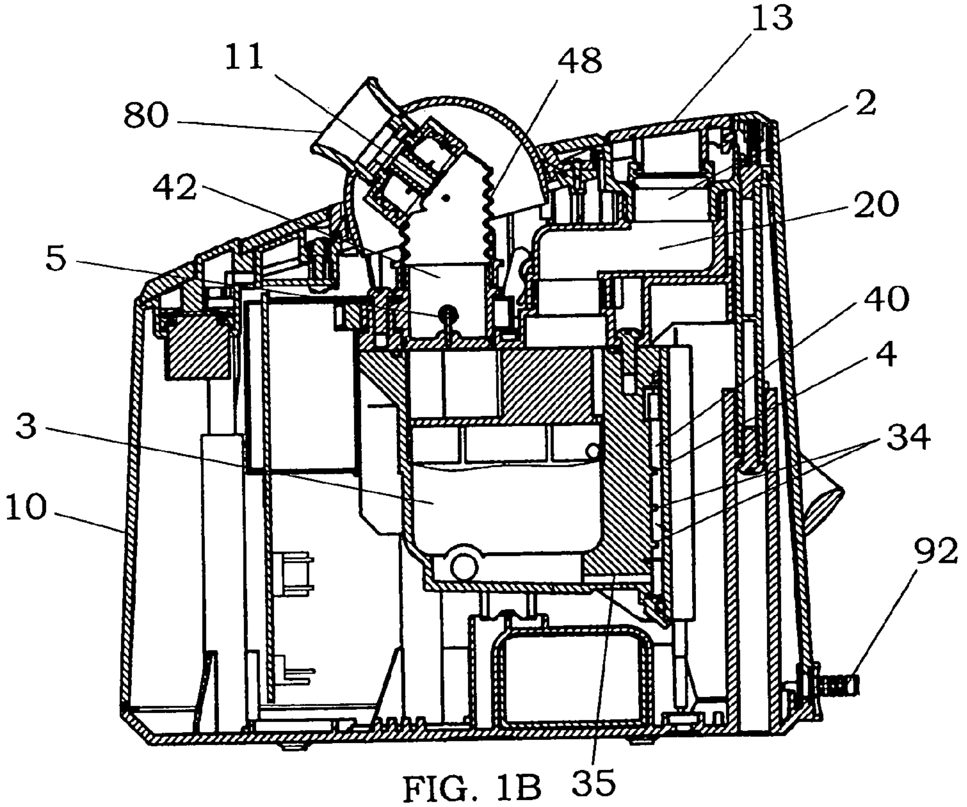

That is, as shown in FIGS. 1A, 1B, 2A and 2B, the beauty machine 1 of the present embodiment is mainly composed of a housing 10 having a steam outlet 11 and a water inlet 2, a hinge cover 13 for the water inlet, a water tank 3 accommodated in the housing 10 and having an overflow port 31, water supply channel 20 extending between the water inlet 2 and the water tank 3, heater 4 for heating water provided from the water tank to generate a steam in a steam chamber 40 formed in the housing, a steam channel 42 extending from the steam chamber 40 to the steam outlet 11, discharge generating portion 5 for generating a discharge in the steam channel 42, drain channel 6 for water drained from the water tank 3 through the overflow port, a flow plug 62 disposed as a shutter in the drain channel 6, an interlocking mechanism 7 for opening and closing the flow plug 62 in response to an opening and closing motion of the hinge cover 13. In FIG. 1A, the numeral 9 designates a protection cover for a steam nozzle 80, which is detachably attached to the housing 10, and also used as a water supply vessel, as described later.

According to this steam beauty machine 1, water provided from the water tank 3 is heated to boiling by the heater 4 to generate the steam in the steam chamber 40. Then the generated steam is fed to the steam channel 42, and exposed to the discharge generated by the discharge generating portion 5, so that fine steam particles are sprayed out from the steam outlet 11. The generation of steam can be controlled by operating an ON/OFF switch 18 provided at an upper front surface of the housing 10. The ON/OFF switch 18, the heater 4 and the discharge generating portion 5 are connected to a control circuit (not shown) built in the housing, and an electric power is supplied to the control circuit through a power cable 92.

Figure 2A:
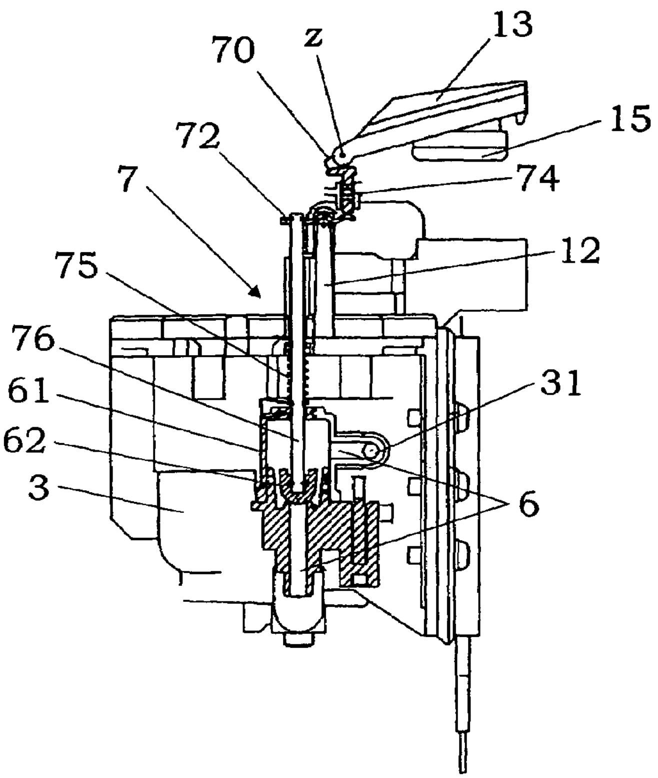
FIGS. 2A and 2B are partially cross-sectional views for explaining operations of an interlocking mechanism of the beauty machine.
Figure 2B:
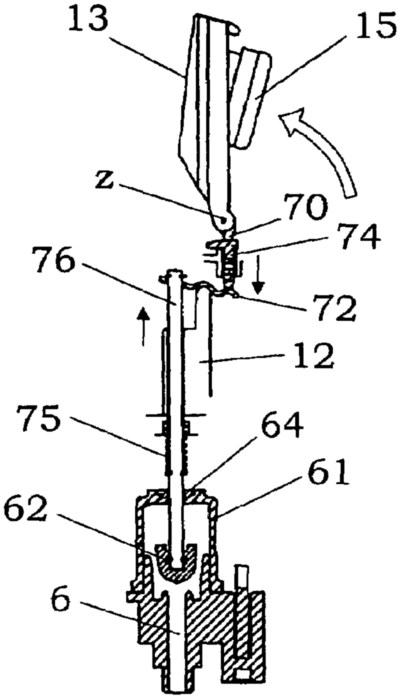

The hinge cover 13 is pivotally supported about a hinge axis Z to the housing 10. The water inlet 2 and the water tank 3 are positioned so as not to be overlapped with each other in a horizontal projection view thereof. The overflow port 31 is formed in a side wall of the water tank 3. When an excessive amount of water is supplied into the water tank 3, it can be drained out of the water tank through the overflow port 31. The water drained from the water tank through the overflow port 31 is fed into a drain channel 6. The drain channel 6 has an overflow control room 61, in which the flow plug 62 is movably supported to open and close the drain channel 6, as shown in FIGS. 2A and 2B. The opening and closing motion of the flow plug 62 is controlled by the interlocking mechanism 7 described later in response to the open and closing motion of the hinge cover 13.

Figure 3:
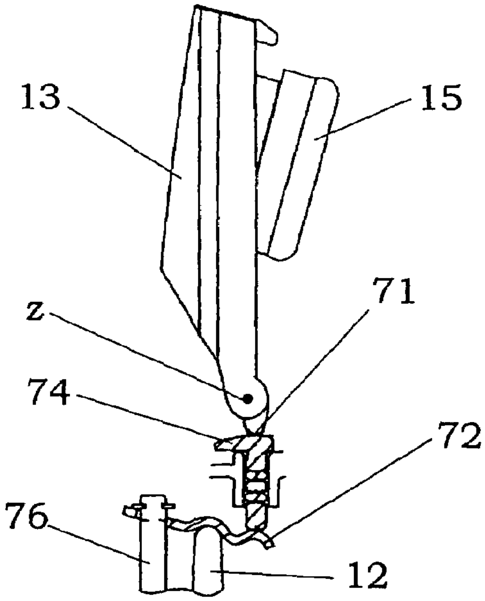
FIG. 3 is an enlarged view of FIG. 2B showing a standing posture of a hinge cover of the beauty machine.

The interlocking mechanism 7 is, as shown in FIGS. 2A, 2B and 3, is composed of a rib 70 formed on the hinge cover 13, and a seesaw member 72 having one end coupled to the rib 70 through a movable pin 74 as a first movable member, and the opposite end coupled to the flow plug 62 through a slide member 76 as a second movable member. The movable pin 74 is a rod-like member having a flat top surface, which is slidably supported in the upward and downward direction. The slide member 76 is a rod-like member having a length larger than the movable pin 74 to make a connection between the opposite end of the seesaw member 72 and the flow plug 62. In addition, the slide member 76 is inserted in the overflow control room 61 through an aperture 64 formed in the ceiling of the overflow control room, and slidably supported in the upward and downward direction. A clearance between the aperture 64 and the slide member 76 is sealed with a gasket in a waterproof manner. The slide member 76 can be made of a metal material such as SUS 304-WS. The flow plug 62 fixed to the bottom end of the slide member 76 is made of an elastic material such as silicon rubber having a hardness of 40 degrees.

A substantially center portion of the seesaw member 72 is supported on a projection 12 as a fulcrum to provide a swinging motion or seesaw motion of the seesaw member. The rib 70 of the hinge cover 13 is pressed against the top flat surface of the movable pin 74. As shown in FIG. 2B, when the hinge cover 13 is pivotally moved about the hinge axis Z to obtain its opened state, the rib 70 pushes the movable pin 74 in the downward direction. This downward movement of the movable pin 74 provides a upward movement of the slide member 76 as a result of the seesaw motion of the seesaw member 72. By the upward movement of the slide member 76, the flow plug 62 is opened.

To move the movable pin 74 without applying a large load to the rib 70 of the hinge cover 13, it is preferred to shorten the rib length and reduce the moving distance of the movable pin. On the other hand, to provide the opening and closing motion of the flow plug 62 with a high degree of reliability, it is preferred to increase the moving distance of the slide member 76. In brief, it is preferred that the moving distance of the second movable member (i.e., the slide member 76) is larger than the moving distance of the first movable member (i.e., the movable pin 74). To meet this condition, the seesaw member 72 of this embodiment is configured in a wave-like shape at its one end coupled to the movable pin 74. In this case, when the movable pin 74 is moved downward by a distance of 1.8 mm, the slide member 76 moves upward by a distance of 3.0 mm. In FIGS. 2A and 2B, the numeral 75 designates a coil spring for applying a spring bias upward to the slide member 76. The projection 12 for supporting the seesaw member 72 is integrally formed with the water tank 3 to improve stability of the fulcrum of the seesaw member 72.

In the opened state of the hinge cover 13, as shown in FIG. 3, a flat end portion 71 of the rib 70 stably contacts the top flat surface of the movable pin 74. In addition, since the movable pin 74 receives the spring bias of the coil spring 75 in the upward direction, it is possible to obtain a contact pressure between the flat portion 71 and the movable pin 74, which is useful to stably keep a standing posture of the hinge cover 13. On the assumption that the standing posture of the hinge cover 13 is stably maintained in the full open state, the shapes of the rib 70 and the movable pin 74 are not limited. In addition, if necessary, another spring member having an adequate spring constant may be used in place of the coil spring 75.

Figure 4A:
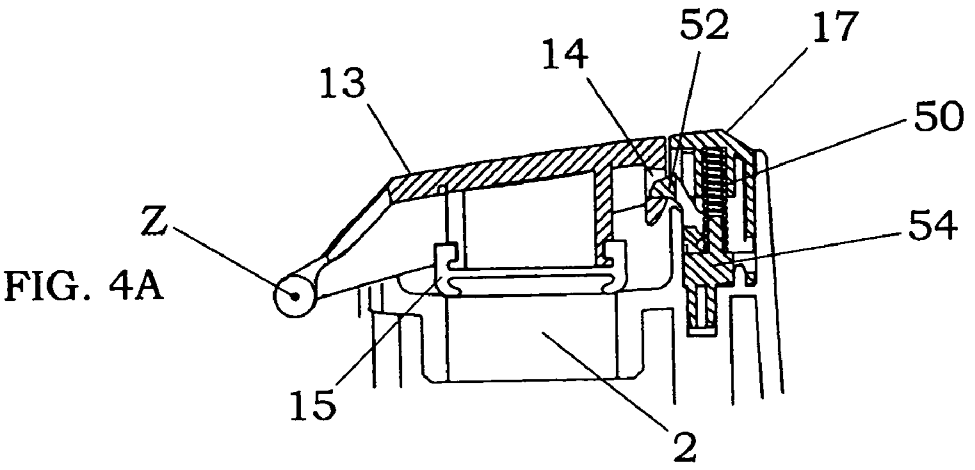
FIGS. 4A to 4C are partially cross-sectional views for explaining operations of a cover locking mechanism of the beauty machine.
Figure 4B:
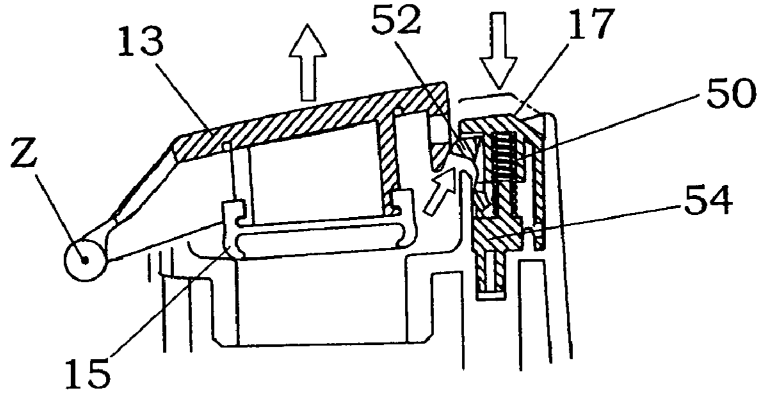
Figure 4C:
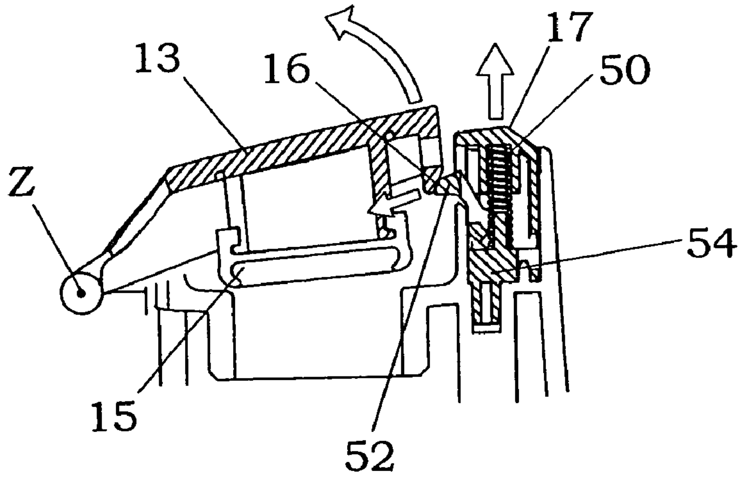

As shown in FIGS. 4A to 4C, the steam beauty machine 1 of this embodiment also has a seal member 15 made of an elastic material and attached to a rear surface of the hinge cover 13 facing to the water inlet 2, a button member 17 exposed to a surface of the housing 10 to be operable by a user, coil spring 50 for applying a spring bias to the button member 17; and a hook 52 for engaging a groove 14 formed in the hinge cover 13.

This button member 17 is attached to a base 54 fixed to the housing 10 through the coil spring 50. The coil spring 50 provides a spring bias to the button member 17 in an upward direction of recovering an initial position of the button member. In the initial position, the hook 52 is projected into the groove 14 to lock the hinge cover 13 in the closed state, as shown in FIG. 4A. When the button member 17 is pushed against the spring bias of the coil spring 50, the hook 52 is removed from the groove 14 to place the hinge cover 13 in the opened state, as shown in FIG. 4B. Thus, the hook 52 is supported to the base 54 to be movable between the projected state, at which the hook 52 is engaged into the groove 14, and a rest state, at which the hook is removed from the groove, in response to the up and down movement of the button member 17.

In the closed state of the hinge cover 13, the seal member 15 is elastically deformed to seal the water inlet 2 in a waterproof manner. When the engagement is released by pushing the button member 17, the hinge cover 13 is removed from the water inlet 2 in a pop-up manner by a resilient force of the seal member 15. In addition, the hinge cover 13 has an inclined surface 16 formed adjacent to the groove 14. As shown in FIG. 4C, when the engagement between the hook 52 and the groove 14 is released by pushing the button member 17, and then the pushing force is removed from the button member, the initial position of the button member is recovered by the spring bias of the coil spring 50, so that the hook 52 is projected again to contact the inclined surface 16 of the hinge cover 13 and push the hinge cover in a direction of facilitating the opening motion of the hinge cover. In this embodiment, a contact angle between the inclined surface 16 and the hook 52 is about 6 degrees.

In the case of closing the hinge cover 13, when the hinge cover is pivotally moved toward the water inlet 2, the inclined surface 16 of the hinge cover contacts the hook 52 in the projected state, and then pushes the hook toward the rest state against the spring bias of the coil spring 50. When the hinge cover 13 is further moved toward the water inlet 2, the hook 52 is engaged into the groove 14 to lock the hinge cover.

Thus, according to the locking mechanism described above, since the closed state of the hinge cover 13 is locked by the engagement between the hook 52 and groove 14, safety is further improved. In addition, since the opening motion of the hinge cover 13 is facilitated by help of the resilient force of the sealing member 15 and the contact between the inclined surface 16 of the hinge cover and the hook 52, usability of the steam beauty machine is also improved.

To efficiently generate steam in the steam chamber 40, it is preferred to prevent that water rapidly flows from the water tank 3 into the steam chamber. In this embodiment, a communication channel 35 having a relatively long axial length and a narrow cross section is formed between the water tank 3 and the steam chamber 40. When the communication channel 35 is configured to have a circular cylindrical shape, a diameter of the communication channel is preferably determined to be sufficiently smaller than the axial length. For example, the diameter and the axial length of the communication channel 35 are 2.5 mm and 18.0 mm, respectively.

Figure 5A:
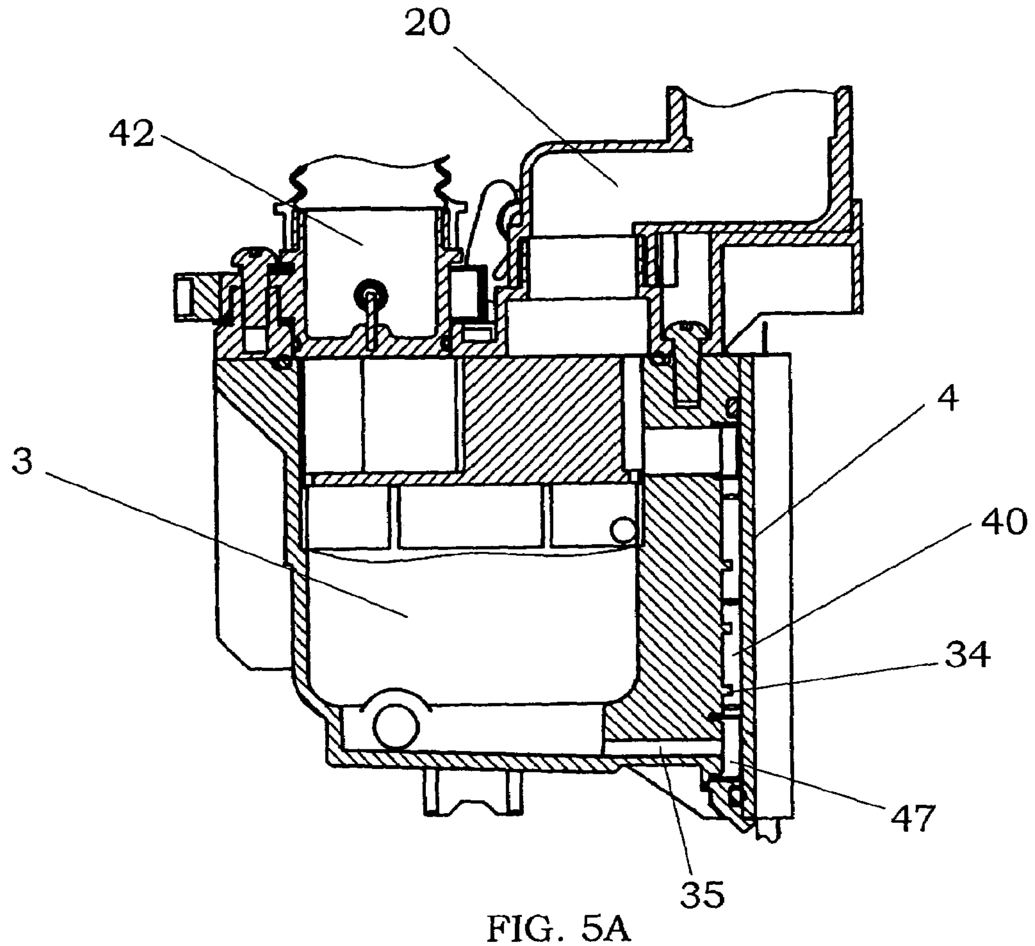
FIGS. 5A and 5B partially cross-sectional views of a steam room with filters of the beauty machine.
Figure 5B:
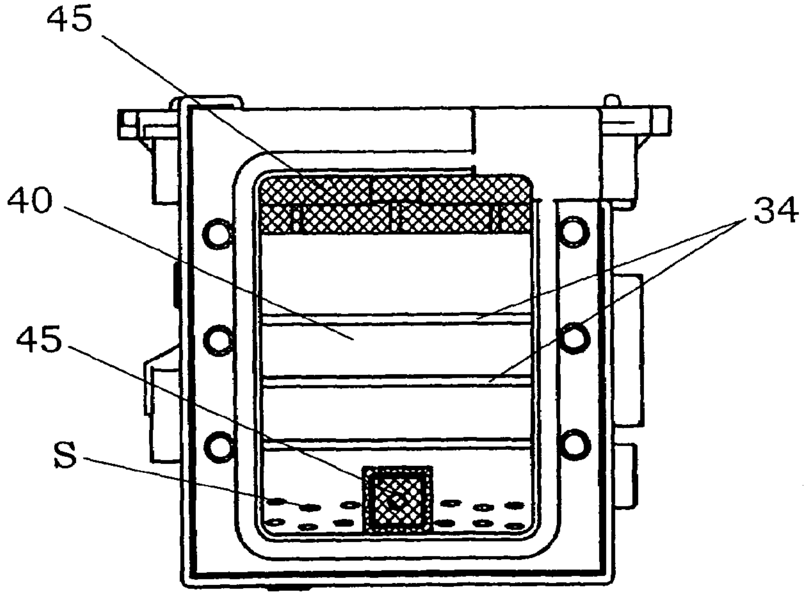

As shown in FIGS. 5*a* and 5B, filters 45 are disposed at coupling portions between the steam chamber 40 and the communication channel 35 and between the steam chamber and the steam channel 42 to remove scales "S" such as calcium carbonate deposited by volatilization of water in the steam chamber. It is effective to prevent clogging of the communication channel 35 or contamination of the water tank 3 with the scales. In addition, it is also effective to prevent that large hot drops (e.g., several ten microns) of water generated in the steam chamber 40 are fed into the steam channel 42. It is preferred that the filter 45 has a mesh size equal to or smaller than 50% of the diameter of the communication channel 35. In this embodiment, the diameter of the communication channel 35 is 2.5 mm, and the mesh size of the filter is 1.0 mm, which corresponds to 40% of the diameter of the communication channel. In FIG. 5A, the numeral 47 designates a ditch for receiving the scales, which is formed at a lower side of the coupling portion in the steam chamber 40. This ditch 47 is useful to prevent clogging of the filter 45 and prolong a maintenance cycle of the steam beauty machine 1.

The steam chamber 40 is provided by an elongate clearance extending in a height direction between an outer side surface of the water tank 3 and the heater 4. It is preferred that a plurality of bosses 34 are formed on the outer side surface of the water tank 3 in the steam chamber 40 such that they are spaced from each other in the height direction. The steam generated in the steam chamber 40 is fed to the steam channel 42 through an opening formed in an upper portion of the steam chamber 40, and then exposed to the discharge generated by the discharge generating portion 5.

In this embodiment, the discharge generating portion 5 is formed with a pair of electrodes disposed above the water tank 3 in the steam channel, and a voltage applying unit for applying a high voltage between the electrodes to generate the discharge. By exposing the steam to the discharge, it is possible to facilitate the generation of fine steam particles. The thus generated fine steam particles are sprayed out from the steam outlet 11. In the steam channel 42 between the steam chamber 40 and the discharge generating portion 5, a partition wall(s) may be formed in a required pattern to trap relatively large hot drops of water. The hot water drops trapped by the partition wall(s) or an inner surface of the steam channel 42 by condensation of steam are returned to the water tank 3 through a circulation channel (not shown).

Figure 6:
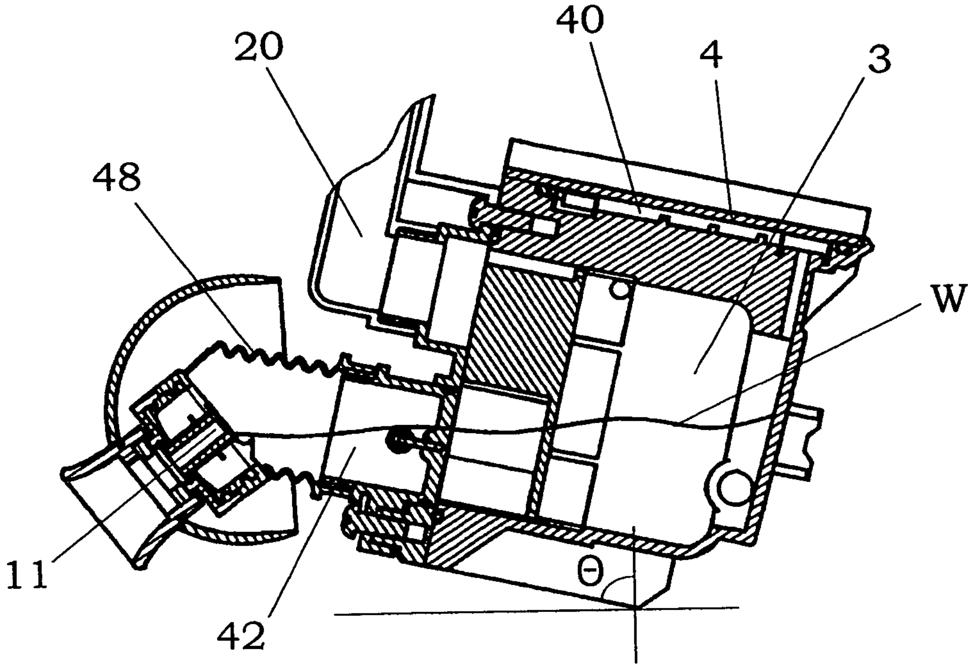
FIG. 6 is a partially cross-sectional view showing resistance to water leakage of the beauty machine.
Figure 7:
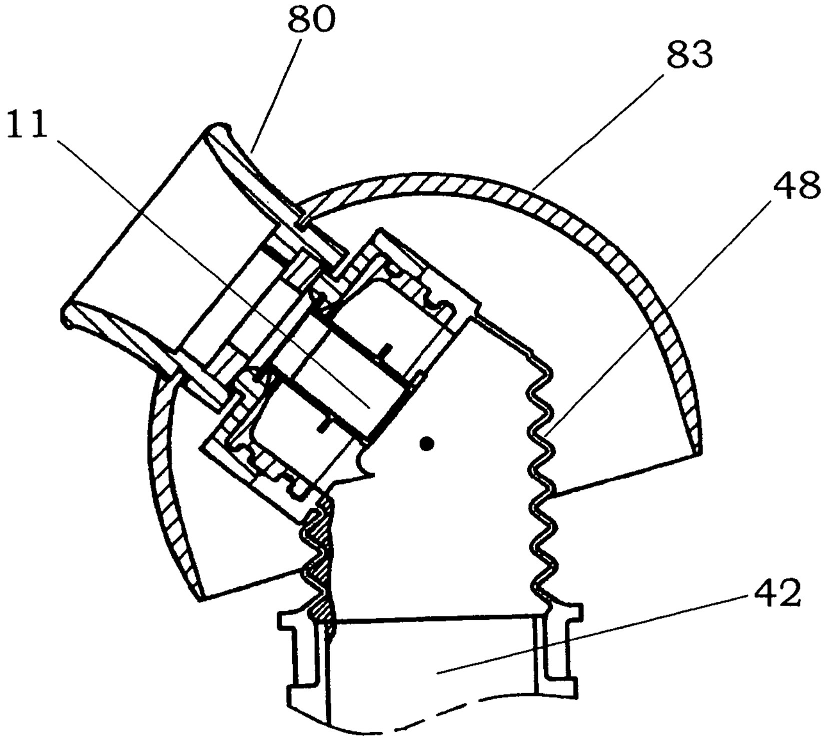
FIG. 7 is a partially cross-sectional view showing a movable nozzle of the beauty machine.

In this embodiment, the steam channel 42 has a vertical portion extending from the discharge generating portion 5 to the steam outlet 11, and positioned so as to be overlapped with the water tank 3 in a horizontal projection view thereof. As shown in FIG. 6, to increase a maximum permissible angle defined as an angle θ, at which a water leakage from the steam outlet 11 begins when the beauty machine 1 is gradually tilted, it is preferred to increase a length of the vertical portion of the steam channel 42. However, as the length is increased, it leads to upsizing of the beauty machine 1. Therefore, by adequately determining the length of the vertical portion of the steam channel 42, it is possible to provide a compact steam beauty machine with improved resistance to water leakage. In FIG. 6, the letter "W" designates a water level in the tilted beauty machine. To prevent the water leakage in the case that the beauty machine is accidentally toppled over, it is preferred that a water absorbing means such as sponge is disposed at the vicinity of the steam outlet 11.

In this embodiment, a steam nozzle 80 is connected to the steam outlet 11, and is coupled to a dome-like shell 83, which is movably supported to the housing 10. In addition, an upper part of the vertical portion of the steam channel 42 is provided by an accordion hose 48. Therefore, it is possible to safely change the steam spraying direction over a wide angular range, while protecting the steam channel 42 with the dome-like shell 83. In addition, since hot water drops formed by condensation of the steam are efficiently captured by a rugged inner surface of the accordion hose 48, it is possible to prevent that the hot water drops are accidentally jetted out from the steam nozzle 80, and further improve the safety of the steam beauty machine 1.

Figure 8A:
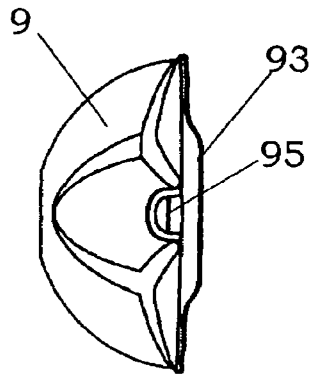
FIGS. 8A to 8C are front, top and side views of a water supply vessel for the beauty machine.
Figure 8B:
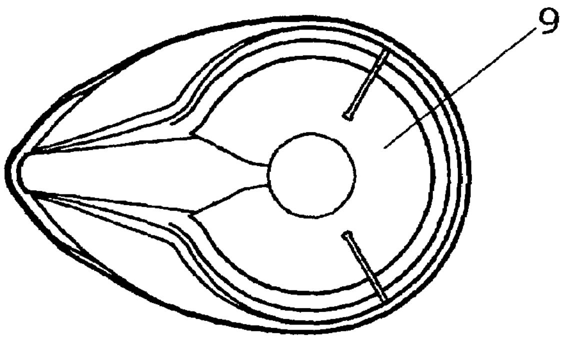
Figure 8C:
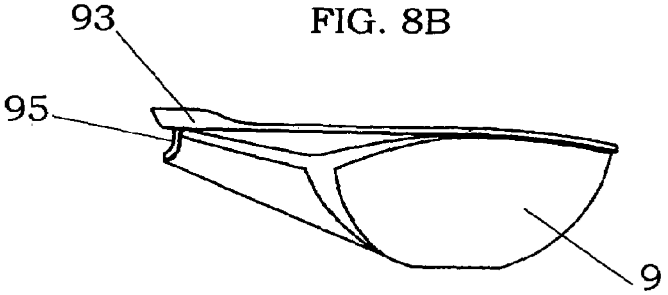
Figure 9:
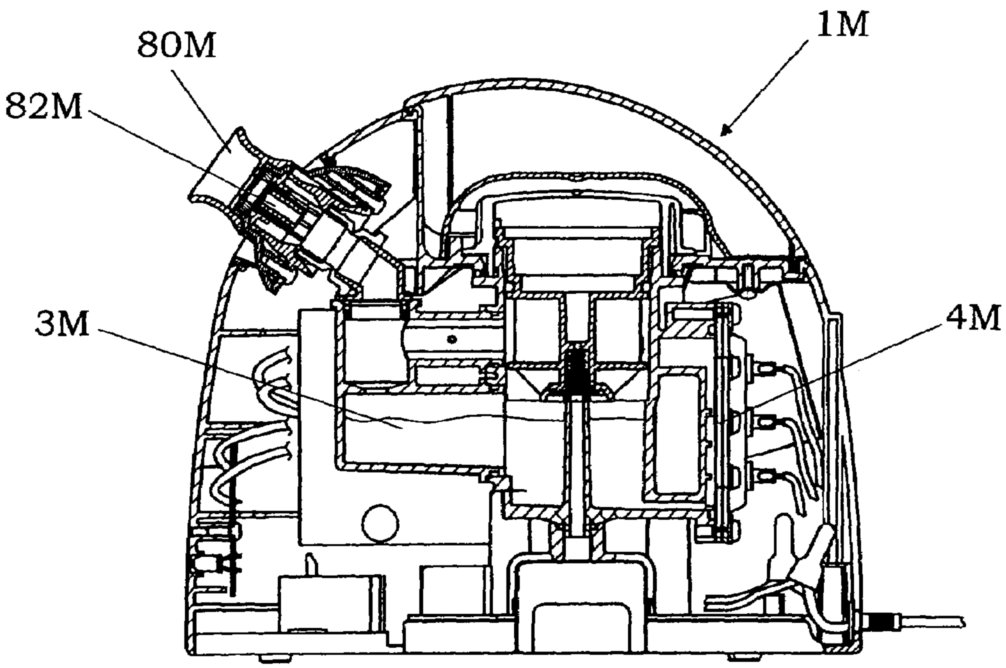
FIG. 9 (PRIOR ART)
FIG. 9 is a cross-sectional view of a conventional steam beauty machine.

As described above, since the protection cover 9 for the steam nozzle 80 is configured in a concave shape, it can be used as the water supply vessel such as a water pot for supplying water into the water tank 3 through the water inlet 2. As shown in FIGS. 8A to 8C, the protection cover 9 has a stopper wall 93 for preventing that a large amount of water rapidly flows into the water inlet 2. In the figures, the numeral 95 designates a pour spout formed at a lower portion of the stopper wall 93 to provide a smooth water flow to the water inlet 2. For example, the pour spout is configured in a rectangular shape having a side of 10 mm.

As understood from the above preferred embodiment, according to the present invention, it is possible to provide the steam generator with improved safety and usability, which is preferably used as the steam beauty machine, by the introduction of the interlocking mechanism between the cover for the water inlet and the shutter for the overflow port.

What is claimed is:

1. A steam generator comprising:

a housing having a steam outlet and a liquid inlet;

a cover for said liquid inlet;

a liquid tank accommodated in said housing and having an overflow port;

a liquid supply channel extending between said liquid inlet and said liquid tank;

a heater for heating a liquid provided from said liquid tank to generate a steam in a chamber formed in said housing;

a steam channel extending from said chamber to said steam outlet;

a drain channel for the liquid drained from said liquid tank through said overflow port;

a shutter disposed in said drain channel; and an interlocking means for opening and closing said shutter in response to an opening and closing motion of said cover.

2. The steam generator as set forth in claim 1, wherein said cover is a hinge cover, and said interlocking means comprises a rib formed on said hinge cover and a seesaw member having its one end coupled to said rib and its other end coupled to said shutter.

3. The steam generator as set forth in claim 2, wherein said rib is coupled to the one end of said seesaw member through a first movable member, and has a flat end portion, which contacts a top of said first movable member such that said hinge cover takes a standing posture in its full open state.

4. The steam generator as set forth in claim 2, wherein said shutter is a flow plug made of an elastic material and provided at one end of a second movable member, and wherein an opposite end of said second movable member is coupled to the other end of said seesaw member.

5. The steam generator as set forth in claim 2, wherein said rib is coupled to the one end of said seesaw member through a first movable member, and said shutter is coupled to the other end of said seesaw member through a second movable member, and wherein said seesaw member is configured such that a moving distance of said second movable member is greater than the moving distance of said first movable member.

6. The steam generator as set forth in claim 5, wherein said seesaw member is configured in a wave-like shape at the one end coupled to said first movable member.

7. The steam generator as set forth in claim 1, further comprising a seal member made of an elastic material and attached to said cover;

a button member exposed to a surface of said housing to be operable by a user;

a spring member for applying a spring bias to said button member; and a hook for engaging a groove formed in said cover;

wherein said seal member is elastically deformed to seal said liquid inlet in a waterproof manner by an engagement between said hook and said groove, and the engagement is released by an operation of said button member against the spring bias, so that said cover is removed from said liquid inlet in a pop-up manner by a resilient force of said seal member.

8. The steam generator as set forth in claim 7, wherein said cover has an inclined surface formed adjacent to said groove, so that said hook contacts the inclined surface of said cover after the engagement between said hook and said groove is released, and pushes said cover in a direction of increasing an opening amount of said cover.

* * * * *